(12) United States Patent
Ilic et al.

(10) Patent No.: US 9,143,056 B2
(45) Date of Patent: Sep. 22, 2015

(54) STACKED VOLTAGE SOURCE INVERTER WITH SEPARATE DC SOURCES

(75) Inventors: Milan Ilic, Cupertino, CA (US); Mika Nuotio, San Francisco, CA (US)

(73) Assignee: EMPOWER MICRO SYSTEMS, INC., San Jose, CA (US)

( * ) Notice: Subject to any disclaimer, the term of this patent is extended or adjusted under 35 U.S.C. 154(b) by 203 days.

(21) Appl. No.: 13/357,616

(22) Filed: Jan. 25, 2012

(65) Prior Publication Data

US 2013/0155735 A1 Jun. 20, 2013

Related U.S. Application Data

(60) Provisional application No. 61/576,363, filed on Dec. 16, 2011.

(51) Int. Cl.
| | |
|---|---|
| *H02M 7/5387* | (2007.01) |
| *H02M 7/72* | (2006.01) |
| *H02M 1/00* | (2007.01) |

(Continued)

(52) U.S. Cl.
CPC .. *H02M 7/72* (2013.01); *H02J 3/32* (2013.01); *H02J 3/381* (2013.01); *H02J 9/06* (2013.01); *H02M 7/5387* (2013.01); *H02M 2001/0077* (2013.01)

(58) Field of Classification Search
CPC ......................... G05F 1/67; H02M 2001/0077
USPC ........................ 363/71; 323/906; 307/77, 82
See application file for complete search history.

(56) References Cited

U.S. PATENT DOCUMENTS

| | | | |
|---|---|---|---|
| 5,642,275 A | 6/1997 | Peng et al. | |
| 6,542,344 B1 * | 4/2003 | Mashiko | 361/93.9 |

(Continued)

FOREIGN PATENT DOCUMENTS

| | | |
|---|---|---|
| JP | 2009290919 A | 10/2009 |
| KR | 1020120130165 A | 11/2012 |

(Continued)

OTHER PUBLICATIONS

Author: Chapman et. al, Title: "Photovoltaic AC Module Composed of a Very Large Number of Interleaved Inverters", Symposium: "Applied Power Electronics Conference and Exposition (APEC), 2011 Twenty-Sixth Annual IEEE", Date: Mar. 6-11, 2011, pp. 976-981, Print ISBN: 978-1-4244-8084-5, Publisher: IEEE, Location: Forth Worth, TX.

(Continued)

*Primary Examiner* — Harry Behm
(74) *Attorney, Agent, or Firm* — Tran & Associates

(57) ABSTRACT

A stacked voltage source inverter having separate DC sources is described herein. This inverter is applicable to low or medium voltage, low to medium power applications such as photovoltaic utility interface systems, battery storage application such as peak shaving with renewables, motor drive applications and for electric vehicle drive systems. The stacked inverter consists of at least one phase wherein each phase has a plurality of low voltage full bridge inverters equipped with an independent DC source. This inverter develops a near sinusoidal approximation voltage waveform with fast switching and small low pass AC output filter. A system controller controls operating parameters for each inverter. The inverter may have either single-phase or multi-phase embodiments connected in either wye or delta configurations.

20 Claims, 15 Drawing Sheets

(51) Int. Cl.
    *H02J 3/32*     (2006.01)
    *H02J 3/38*     (2006.01)
    *H02J 9/06*     (2006.01)

(56) References Cited

U.S. PATENT DOCUMENTS

| | | | |
|---|---|---|---|
| 7,643,319 | B2 | 1/2010 | Wagoner |
| 7,796,412 | B2 | 9/2010 | Fornage |
| 7,962,249 | B1 * | 6/2011 | Zhang et al. ............... 700/295 |
| 8,089,178 | B2 | 1/2012 | Spanoche et al. |
| 8,089,785 | B2 | 1/2012 | Rodriguez |
| 8,271,599 | B2 | 9/2012 | Eizips et al. |
| 2005/0127853 | A1 | 6/2005 | Su |
| 2005/0139259 | A1 | 6/2005 | Steigerwald et al. |
| 2009/0284998 | A1 | 11/2009 | Zhang et al. |
| 2011/0012429 | A1 | 1/2011 | Fornage |
| 2011/0208372 | A1 | 8/2011 | Hansen |
| 2012/0091817 | A1 * | 4/2012 | Seymour et al. .............. 307/82 |
| 2012/0126623 | A1 * | 5/2012 | Koehl .......................... 307/76 |

FOREIGN PATENT DOCUMENTS

| | | | |
|---|---|---|---|
| WO | WO2010037393 | A1 | 4/2010 |
| WO | WO2011085259 | A3 | 7/2011 |

OTHER PUBLICATIONS

Author: Abdul Rahiman Beig et. al., Title: "A novel fifteen level inverter for photovoltaic power supply system", Symposium: "Industry Applications Conference, 2004. 39th IAS Annual Meeting. Conference Record of the 2004 IEEE (vol. 2)", Date: Oct. 3-7, 2004, pp. 1165-1171 vol. 2, Print ISBN: 0-7803-8486-5, Publisher: IEEE, Location: Seattle, WA.

Author: O. Alonso et. al., Title: "Cascaded H-Bridge Multilevel Converter for Grid Connected Photovoltaic Generators with Independent Maximum Power Point Tracking of each Solar Array", Symposium: "Power Electronics Specialist Conference, 2003. PESC '03. 2003 IEEE 34th Annual (vol. 2)", Date: Jun. 15-19, 2003, pp. 731-735 vol. 2, Print ISBN: 0-7803-7754-0, Publisher: IEEE, Location: Acapulco, Mexico.

Author: S. Rivera, Title: "Cascaded H-Bridge Multilevel Converter Multistring Topology for Large Scale Photovoltaic Systems", Symposium: "Industrial Electronics (ISIE), 2011 IEEE International Symposium on", Date: Jun. 27-30, 2011, pp. 1837-1844, Print ISBN: 978-1-4244-9310-4, Publisher: IEEE, Location: Gdansk, Poland.

Author: Fang Zheng Peng et. al., Title: "A Multilevel Voltage-Source Inverter with Separate DC Sources for Static Var Generation", Symposium: Industry Applications, IEEE Transactions on (vol. 32, Issue: 5), Date: Oct. 8-12, 1995, pp. 2541-2548 vol. 3, Print ISBN: 0-7803-3008-0, Location: Orlando, FL.

* cited by examiner

| |
|---|
| System controller defines output frequency and operating voltage for each basic inversion unit (BIU) (690) |
| System controller assigns master function to one basic inversion unitBIU (692) |
| System controller assigns slave function to all other stacked basic inversion unitBIU (694) |
| Master starts first and provides reference frequency to slave basic inversion unitBIU (696) |
| Slaves lock to reference frequency using PLL and start sending its own power (698) |
| System controller monitors power and can adjust basic inversion unitBIU as necessary (699) |

FIG. 7

STACKED VOLTAGE SOURCE INVERTER WITH SEPARATE DC SOURCES

This application claims priority to Provisional Application Ser. No. 61/576,363, filed Dec. 16, 2011, the content of which is incorporated by reference.

The present invention relates to a stacked voltage source inverter with separate DC sources, and more particularly to a stacked voltage source inverter with separate DC sources including an exemplary apparatus and a method for use in photovoltaic systems, which can operate in off grid and on grid operation. The fields of use for this unique technology are, but not limited to, solar electricity generation, electric vehicles, energy storage, UPS, data center power management and motor drives.

Recent awareness of the negative environmental, geopolitical, nations' security, health care cost impacts of centralized liquid fossil petroleum and polluting coal combustion are driving the development of clean technologies such as photovoltaics (solar). At present, the widespread use and installation of electric capacity from solar equipment is hampered by several factors. Current electronic solutions for transferring solar energy to the grid-tied and off-grid applications suffer from short product lifetime, large physical size/weight, and substantial lifetime costs.

Today, photovoltaic systems use an inverter that converts Direct Current (DC) from solar cells to Alternating Current (AC) for use in grid-tied and off-grid applications. There are three classes of solar inverter: central, string and module-level ("micro-inverter"). Presently, the most typical photovoltaic array uses a central and string inverter. These standard system set-ups have a plurality of sub-arrays, where each sub-array in turn uses individual solar panels. A junction box combines the output of the various sub-arrays to form a DC signal that is supplied to an inverter. The inverter converts the DC to AC and supplies the AC to the power grid. In such a system, the amount of power that is efficiently coupled to the grid is important for the cost recovery of the system. As such, the inverter must be as efficient as possible.

Efficiency, or lack of it, is a primary economic driver in photovoltaic systems, as higher electricity yield directly equates to more revenue for the owner. For example, a conventional central or string system provides a number of solar panels configured in a series arrangement, the power from the panels then converted from direct current to alternating current at a central point. However the efficiency of the string of panels can be dramatically degraded by diminished output by any one of the series-connected panels. Sources of diminished output range from module failure to bird droppings to shade or partial shade of a portion of the series of panels caused by physical obstructions.

To enhance the overall efficiency, "micro-inverters" can be used such that each solar panel is coupled to an individual inverter and produces energy independently of adjacent modules, whether connected in series or in parallel. The AC outputs of the micro-inverters on each module are combined and coupled in parallel to the power grid. Although the use of micro-inverters is more efficient than a single central or string inverter on a system level, the best of today's micro-inverters have a unit efficiency of 95% or less, while the best string and central inverters have 98% unit efficiency.

U.S. Pat. No. 7,796,412 discloses an apparatus for power conversion. The apparatus has at least two power stages, each power stage of the at least two power stages capable of converting DC input power to DC output power; and a controller for dynamically selecting, based on a first DC power, one or more power stages of the at least two power stages for converting the first DC power to a second DC power, further comprising an output circuit coupled to the at least two power stages for converting the second DC power to AC power.

U.S. Pat. No. 8,089,178 discloses a direct current to pulse amplitude modulated ("PAM") current converter, denominated a "PAMCC", which is connected to an individual source of direct current. The PAMCC receives direct current and provides pulse amplitude modulated current at its three output terminals, wherein the current of each terminal is one hundred twenty degrees out of phase with the other two terminals. The pulses are produced at a high frequency relative to the signal modulated on a sequence of pulses. The signal modulated onto a sequence of pulses may represent portions of a lower frequency sine wave or other lower frequency waveform, including DC. When each phased output is connected in parallel with the outputs of similar PAMCCs an array of PAMCCs is formed, wherein each voltage phased output pulse is out of phase with respect to a corresponding current output pulse of the other PAMCCs. An array of PAMCCs forms a distributed three-phase multiphase inverter whose combined output is the demodulated sum of the current pulse amplitude modulated by each PAMCC on each phase.

In both approaches high voltage switching components have to be used for parallel grid application. The main drawbacks with those approaches are the high cost of semiconductor components, due to high voltage design, and relatively low operating frequency due to high switching losses. In addition large and expensive low pass filtering components are required due to low switching frequency. Thus, a need for an inverter that can operate with high switching frequency and high efficiency for applications in AC power systems is clearly needed.

Accordingly, it is an object of the present invention to provide a new and improved stacked voltage source inverter and more specifically a stacked voltage source inverter for connecting to a high voltage, high power AC system.

It is another object to provide a wye or delta configured stacked voltage source inverter for photovoltaic interface to the grid.

SUMMARY OF THE INVENTION

In one aspect, a method and apparatus for power conversion is disclosed. A direct current (DC) voltage source inverter to supply power to an alternating current (AC) power system includes a plurality of full bridge inverters, each having a primary node and a secondary node, each of said full bridge inverters having a positive and a negative node, each of said full bridge inverters having a voltage supporting device electrically connected in a parallel relationship between said positive node and said negative node and a direct current (DC) source connected between the positive and negative nodes; at least one stacked inverter phase, each stacked inverter phase having a plurality of said full bridge inverters, each of said full bridge inverters in each stacked inverter phase interconnected in a series relationship with said secondary node of one of said full bridge inverters connected to said primary node of another full bridge inverter, said series interconnection defining a first full bridge inverter and a last full bridge inverter, each phase having an input node at said primary node of said first full bridge inverter and an output node at said secondary node of said last full bridge inverter; a local controller coupled to each full bridge inverter generating control signals to the full bridge inverter to output an approximate nearly sinusoidal voltage waveform; the combination of said full bridge inverter and said local controller forming a basic inversion unit (BIU); a system level controller communicating with the local controller of each basic inversion unit, the system level controller generating a system control signal for configuration activation, deactivation and operating mode selection of said basic inversion unit.

The method includes generating a first error signal from comparison of an average DC voltage from a plurality of DC sources with a reference DC voltage; generating a second error signal from an average DC current with said detected and averaged AC current level; activating and deactivating a plurality of full bridge inverters based on the first and second error signals to approximate the sinusoidal voltage waveform.

Implementations of the above aspect can include one or more of the following. The method can include detecting the DC voltage levels of a plurality of DC sources and calculating power. The method includes averaging said DC voltage levels and comparing said average with a reference DC voltage. The method includes comparing said average with said detected and averaged AC current levels. The method includes generating a phase modulation signal from said second error signal and an AC line voltage detected period. An AC line voltage period can be detected using a phase locked loop. The method includes generating a plurality of firing reference signals for said full bridge inverters using said phase modulation signal. The method includes determining a modulation index and providing a reference table for said modulation index. In another aspect switching devices firing signals can be calculated based on phase modulation signal using a digital signal processor (DSP).

The method includes providing communication between the basic inversion units and a system controller. The system controller controls a basic inversion unit operating range and also decides on needs of activating or deactivating of each basic inversion unit. The method includes interconnecting a plurality of full bridge inverters using a single conductor in series In one embodiment the system controller controls a single basic inversion unit operating as a current source and plurality of basic inversion units operating as voltage sources.

In another embodiment the system controller controls plurality of basic inversion units operating as voltage sources.

In other implementations of the above system can include one or more of the following. Three stacked inverter phases can be used and connected to form a wye (Y) or a delta (A) connection. Each basic inversion unit incorporates a switch to selectively short its output in the event of individual stage faults, allowing the remaining series connected basic inversion units to continue to operate. The full bridge inverter can be a first switching pair and a second switching pair, each of said switching pairs having a plurality of switching means for controllably regulating electrical current flow, each of said switching means having a first end and a second end, said first switching pair having a plurality of switching means electrically connected at said first end at said positive node of said full bridge inverter, said second end of one of said switching means of said first switching pair electrically connected to said primary node, said second end of another of said switching means of said first switching pair electrically connected to said secondary node, said second switching pair having a plurality of switching means electrically connected at said second ends at said negative node of said full bridge inverter, said first end of one of said switching means of said second switching pair electrically connected to said primary node, said first end of another of said switching means of said second switching pair electrically connected to said secondary node. The primary node can be connected to an inductor.

The secondary node can be connected to an inductor. A capacitor can be connected between the primary and secondary nodes to generate a local AC voltage reference used for synchronization of the basic inversion units to the AC grid phase. Each basic inversion unit detects the line frequency when the capacitor is present. The capacitors also provide short term protection against reverse current flow in the event to individual device failures. The switching device can be a gate turn-off device and an anti-parallel device connected in parallel and oppositely biased with respect to one another. The gate turn-off device comprises a component selected from the group consisting of: a gate turn-off thyristor, an insulated gate bipolar transistor (IGBT), a metal-oxide-semiconductor field-effect transistor (MOSFET), a metal semiconductor field effect transistor (MESFET), a junction gate field-effect transistor (JFET), a MOSFET controlled thyristor, a bipolar junction transistor (BJT), a static induction transistor, a static induction thyristor and a MOSFET turn-off thyristor, a gallium nitride (GaN) transistor, a silicon carbon (SiC) transistor. The antiparallel device can be a diode. Each full bridge inverter can be connected to capacitors, batteries, fuel cells, photovoltaic cells or biomass cells. A buck or boost voltage regulation circuit can be placed between the DC power source and the full bridge inverter within the basic inversion unit. An active filter can decouple AC voltage modulation imposed on the DC voltage within each basic inversion unit when used with DC sources including photovoltaic cells. A variable number of basic inversion units can be used in a phase to match a specific grid voltage. Each of basic inversion unit can operate at different DC power levels. A variable number of basic inversion units can be used for each phase.

In another aspect, a method for inverting a plurality of direct current (DC) sources to approximate a sinusoidal voltage waveform includes detecting grid AC voltage level where a stacked phase will be connected to an AC grid network; calculating AC start up voltage for stacked basic inversion units by a system controller; calculating power, implementing maximum power point tracking algorithm, and generate a reference DC voltage; averaging said input DC voltage levels; comparing said average DC voltage levels with a reference DC voltage; generating a first error signal from said comparison of said average with a reference DC voltage; comparing an average DC current from the DC voltage sources with detected AC current levels; generating a second error signal from said comparison of said average with said detected AC current levels; generating a phase modulation signal from said second error signal; detecting an AC line voltage having a period; generating a phase reference signal directly related to said period of said AC line voltage; generating a plurality of firing reference signals for a full bridge inverter using said phase reference signal; determining a modulation index; and providing a reference table for said modulation index.

In one implementation, the output shorting means, e.g. relay, solid state switch, or other, is an optional configuration. Each unitary inversion unit can have the shorting means to prevent the possibility where the system could not operate if one of the series connected units fails or does not have enough DC input power to operate. The control of the shorting means could come from either a) the local controller, or b) from the system controller. The system controller can close at least one parallel switch with a current limiting device that will serve as a phase reference signal said AC line voltage for synchronization of each basic inversion unit prior to the start of power generation by the stacked basic inversion units.

In another aspect, a method for inverting a plurality of DC sources to approximate a sinusoidal voltage waveform includes sensing an average DC voltage from a plurality of DC sources; activating and deactivating a plurality of full bridge inverters based on the sensed DC voltage.

Implementations can include one or more of the following. The method includes providing communication means between the basic inversion units and a system controller. The method includes detecting the AC voltage level and creating first voltage reference signal if voltage is outside a range calculated by the system controller. The method includes detecting the AC voltage levels and creating first current reference signal if voltage is inside the range calculated by the system controller. The method includes averaging said AC voltage levels and comparing said average with a reference DC voltage. The method includes averaging said AC current levels and comparing said average with a reference DC current.

The method includes generating a phase shift signal from said user command signal. The method includes detecting an AC line voltage having a period and generating a phase reference signal directly related to said period of said AC line voltage. The method includes generating a plurality of firing signals for a plurality of full bridge inverters using said phase reference signal and said phase shift signal. The method includes determining a modulation index and providing a reference table for said modulation index.

The method includes determining firing signals by comparing phase reference signal to up-down digital counters.

Advantages of the preferred embodiments may include one or more of the following. The system requires only 2 cables for each inverter. The system is highly efficient, yet scalable. The system can be configured for single or three phase operation. The system is highly reliable, small form factor, and very light weight. The system is flexible supporting multiple grid voltages and frequencies with a single basic inversion unit device configuration.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 7 shows an exemplary off-grid power system control application.

DESCRIPTION

Figure 1:
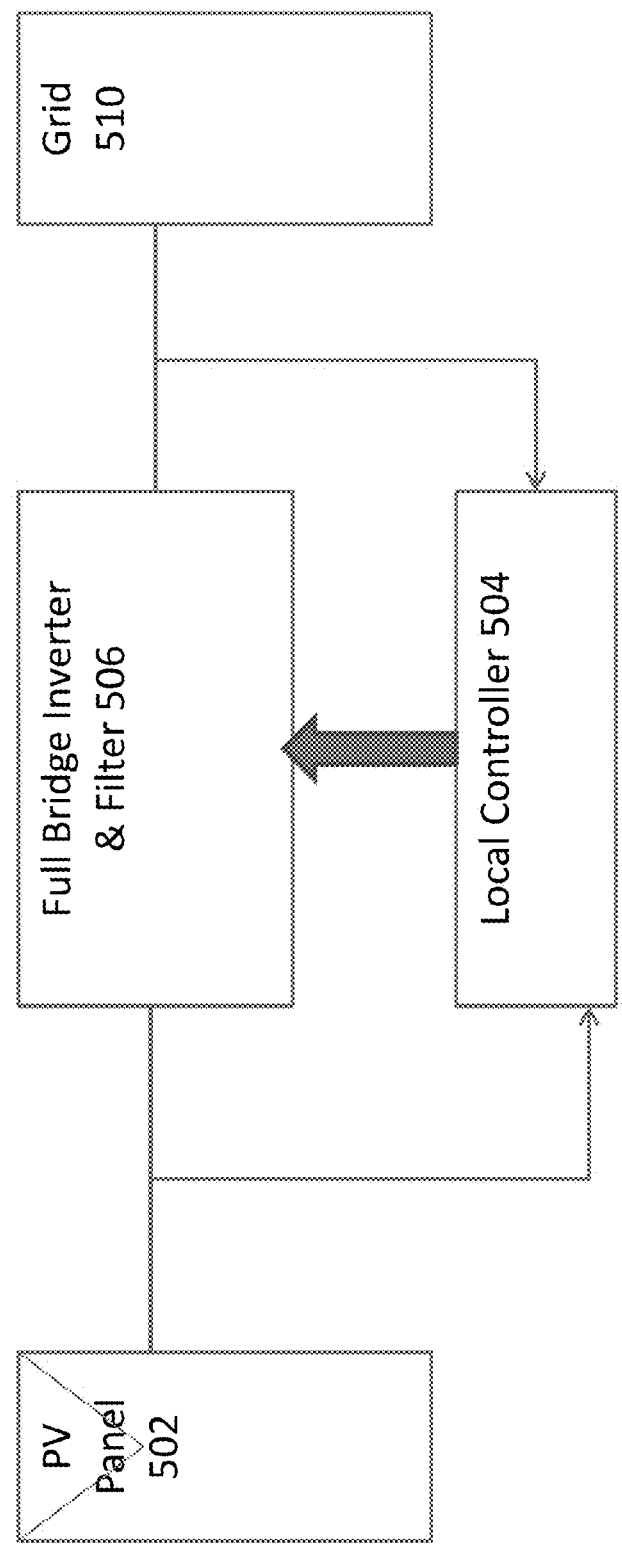
FIG. 1 shows an exemplary power control system.

FIG. 1 shows an exemplary power control system. The system includes one or more photovoltaic panels 502. Power generated by the panels 502 are provided to a photovoltaic inverter and filter combination 506 and provided to a power grid 510. A local controller 504 (discussed in detail below) monitors panel and grid voltages and generates control signals to the inverter and filter 506.

In one embodiment, the local controller 504 controls a full bridge inverter, and a communication interface to allow the local controller to communicate with a system controller. The full bridge inverter can take energy generated by the PV panel. The output of the PV panel can be smoothed by a capacitor. The full bridge output is then presented to a low pass filter before it is provided at an output section.

Figure 2A:
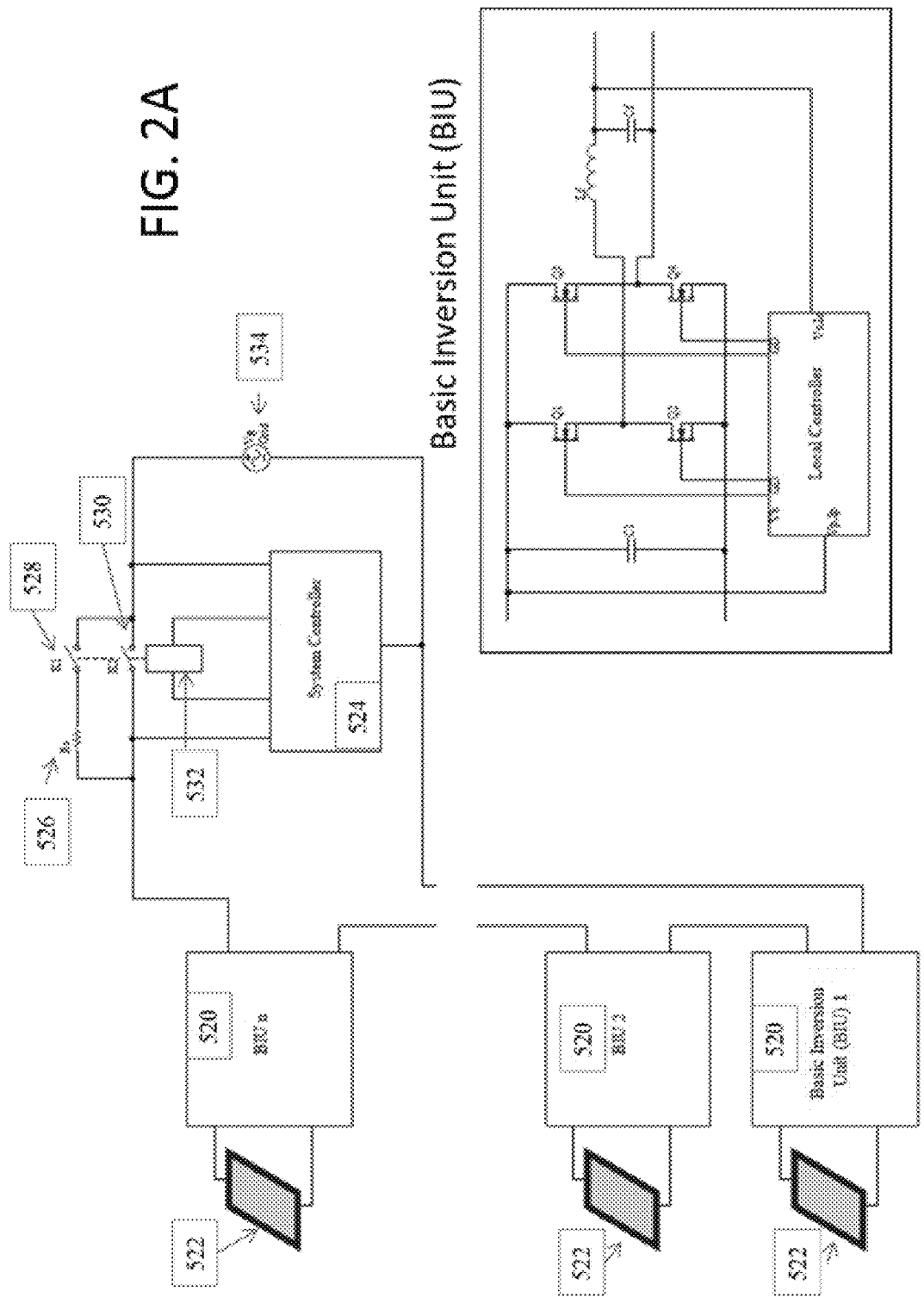
FIG. 2A shows an exemplary stacked phase inverter with system controller for grid application.

FIG. 2A shows a stacked phase with a system controller for grid tied application. FIG. 2A has a plurality of solar panels 522 providing power to basic inversion units 520. The basic inversion units 520 are connected in series, with the output of each basic inversion unit 520 controlled by a system controller 524. The output of the series connected basic inversion units 520 is also connected to a resistor 526 in series with switch K1 528. The basic inversion units 520 are also connected in series with switch K2 530. Switches 528 and 530 could either be solid state switches or relays. Switches 528-530 are controlled by system controller. The output of the switches 528-530 are provided to the grid 534. The system can handle a variable number of series connected basic inversion units, where the minimum and maximum number of basic inversion units per system is determined by the aggregate grid voltage across all the series connected full bridge inverters and the maximum and minimum AC output voltage rating of each basic inversion unit. Each basic inversion unit can operate as voltage source in order to realize effective basic inversion unit stacking.

In another embodiment, the system controller can configure one basic inversion unit as a current source, and the remaining basic inversion units can be used as voltage sources.

Three separate series connected groups of basic inversion units can be configured as a 3-phase inversion system in one embodiment.

In one exemplary module of the photovoltaic to grid application, a system controller includes an outer regulation loop that controls switches K1 and K2 that supply power to the grid. The system controller receives communications from basic inversion units over a communication channel. The communication channel can be wired such as the power-line communication channel or can be wireless such as Zigbee transceivers, among others. The system controller also implements algorithms detecting abnormal grid conditions and methods of disconnecting the stacked basic inversion unit system from the grid by controlling switches K1 and K2.

Figure 2B:
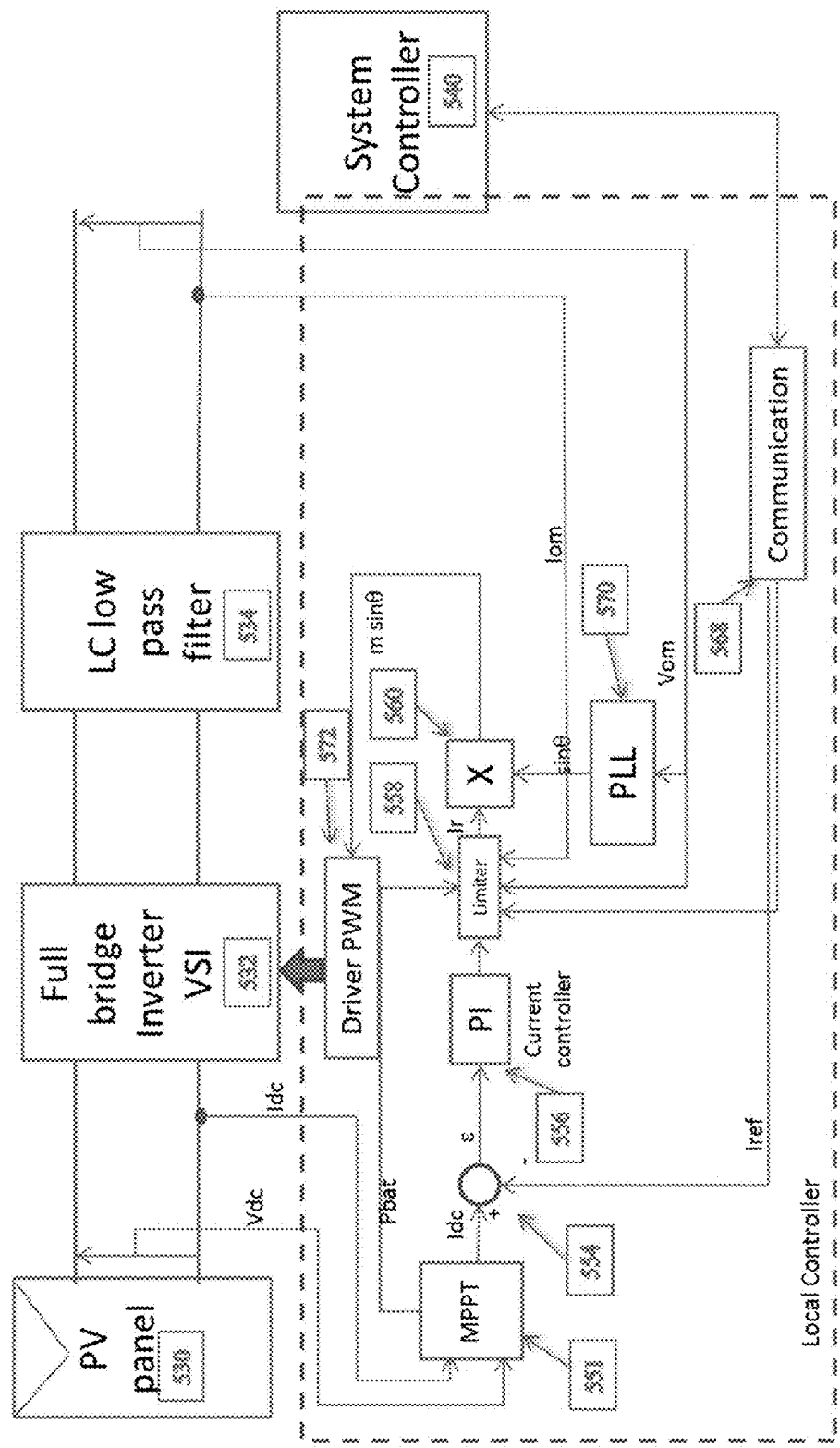
FIG. 2B shows an exemplary local control system for a photovoltaic to grid application.

FIG. 2B show embodiments of the basic inversion unit of FIG. 1. A solar panel 530 provides direct current (DC) output to a full bridge inverter 532. The output of the full bridge inverter 532 is provided to a low pass filer 534 which can be an inductor-capacitor (LC) type filter in one embodiment. The output of the filter 534 is provided to an AC power grid or AC power bus. The output of the filter 534 is monitored by the local controller 550. The system controller 540 monitors output voltage and current of a phase witch stacked basic inversion units, as shown in FIG. 2A. The system controller sends commands to a communication module 568 to set parameters of a limiter 558 to adjust the voltage and current generated by the inverter 532.

Figure 3:
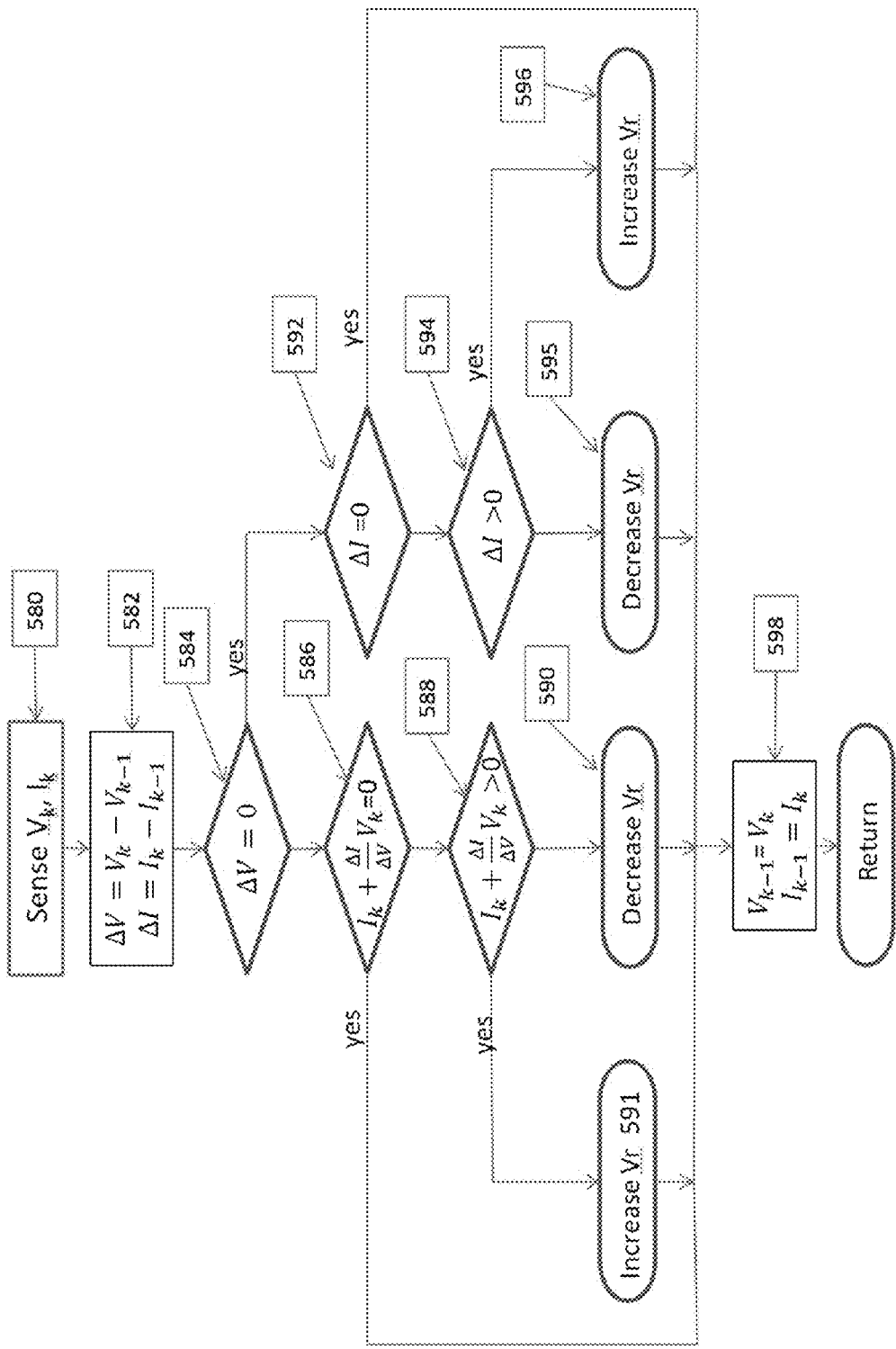
FIG. 3 shows an exemplary maximum power point tracking (MPPT) process for photovoltaic application.

The system of FIG. 2B is monitored by an maximum power point tracking (MPPT) module 551 whose details are discussed in FIG. 3. The MPPT module 552 monitors power from the panel 530. The MPPT module 551 output is received by a summer 554 that drives a DC voltage controller 556, which can be a proportional integral controller in one embodiment. A reference current value is the output of the DC voltage controller. The voltage controller 556 output is connected to the limiter 558 to generate an output m, modulation index. A multiplier 560 receives the output of the limiter 558 and a phase lock loop (PLL) 570 to generate an output m sin Θ. The limiter 558 and PLL 570 monitor the grid output as supplied through the low pass filter 534. The output of the multiplier 560 is supplied to a driver 572 such as a pulse width modulation (PWM) driver that drives the full bridge inverter 532.

FIG. 3 shows an exemplary MPPT process. First, the system senses voltage at time k V(k) and current at time k I(k) (580). Next, the voltage difference and current difference between the current period and the prior period is determined (582). In 584, if a voltage difference exists, the process proceeds to 586 to determine if $I(k)+\Delta I/\Delta V(V(k)=0$, and if so branches to 598. If not, from 586, the process determines whether $I(k)+\Delta I/\Delta V(V(k)>0$ (588), and if so increases Vr (592) and otherwise decreases Vr (590).

Correspondingly, in 584, if the voltage difference is zero, the process proceeds to 592 to determine if $\Delta I=0$, and if so branches to 598. If not, from 592, the process determines whether $\Delta I>0$ (594), and if so increases Vr (596) and otherwise decreases Vr (594).

Figure 4:
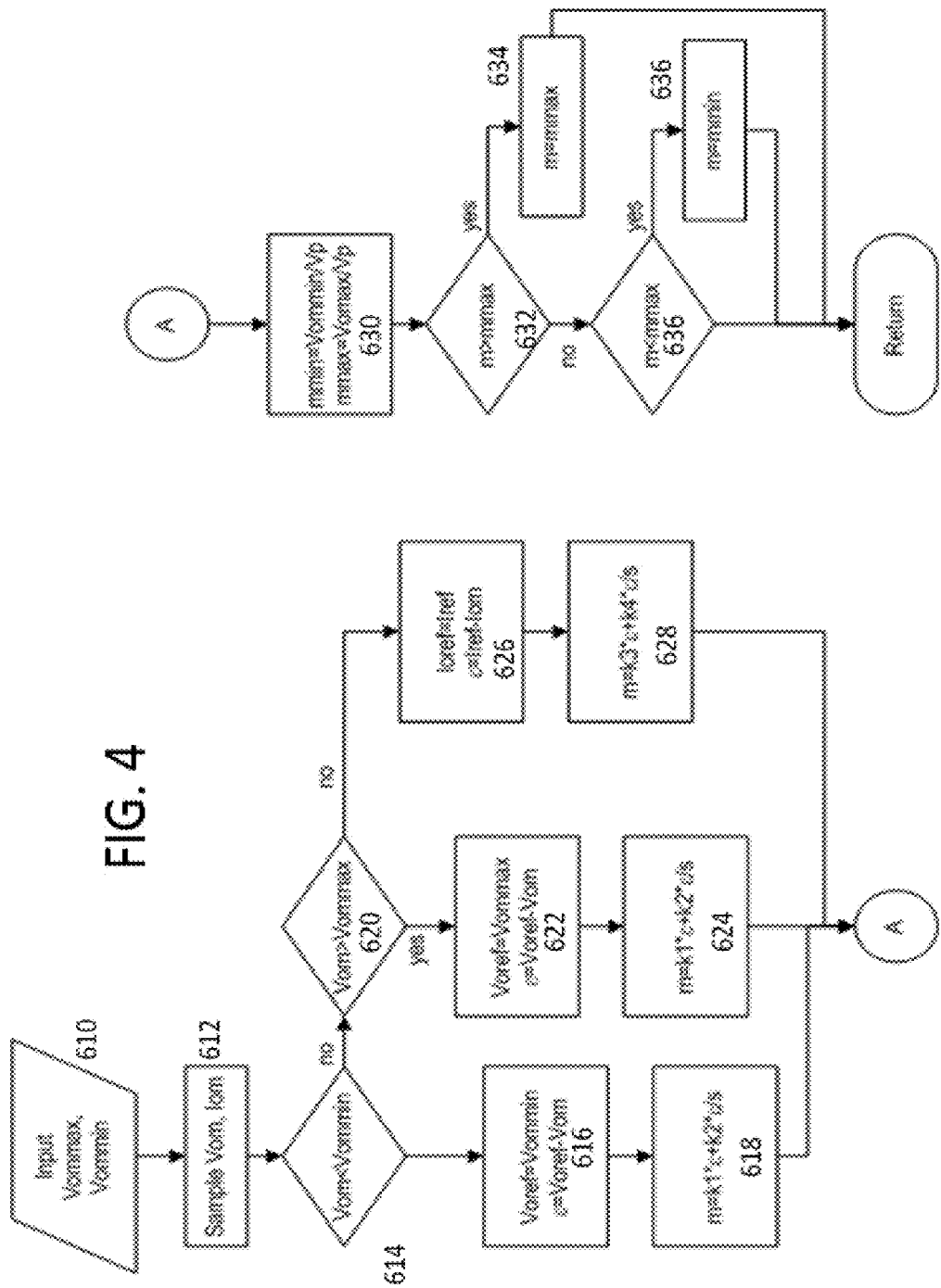
FIG. 4 shows an exemplary module voltage and current limiting process and modulation index calculation and verification against operating limits.

FIG. 4 shows an exemplary current limiting process for the grid voltage. The maximum and minimum voltage values are received from system controller (610). Next, the system samples inverter output voltage Vom and current Iom (612). Next, the process determines if Vom is less than Vommin in 614. If the output voltage reference Voref=Vommin, then a voltage controller loop is run. $\epsilon$ is set as Voref−Vom (616) and then m is set to be $k1*\epsilon+k2*\epsilon/s$ (618).

From 614, if Vom is greater than or equal to Vommin, the process determines if Vom>Vommax (620). If yes, Voref is set to Vommax and $\epsilon$ is set to Voref−Vom (622) and voltage control limiting loop is run. The process then sets m as $k1*\epsilon+k2*\epsilon/s$ (624). If no, the regular current loop is run having Ioref set to Iref and $\epsilon$ is set as Iref−Iom (626). Next, m is set to be $k3*\epsilon+k4*\epsilon/s$ (628).

From operations 618, 624, or 628, the process proceeds to check acceptable range for modulation index m. Limits for m are set to mmin to be Vommin/Vp and mmax to be Vomax/Vp (630). Next, the process tests if m>mmax (632). If so, the process sets m=mmax (634). If not, the process tests if m<mmax (636) and if so m is set to mmin (636).

Figure 5:
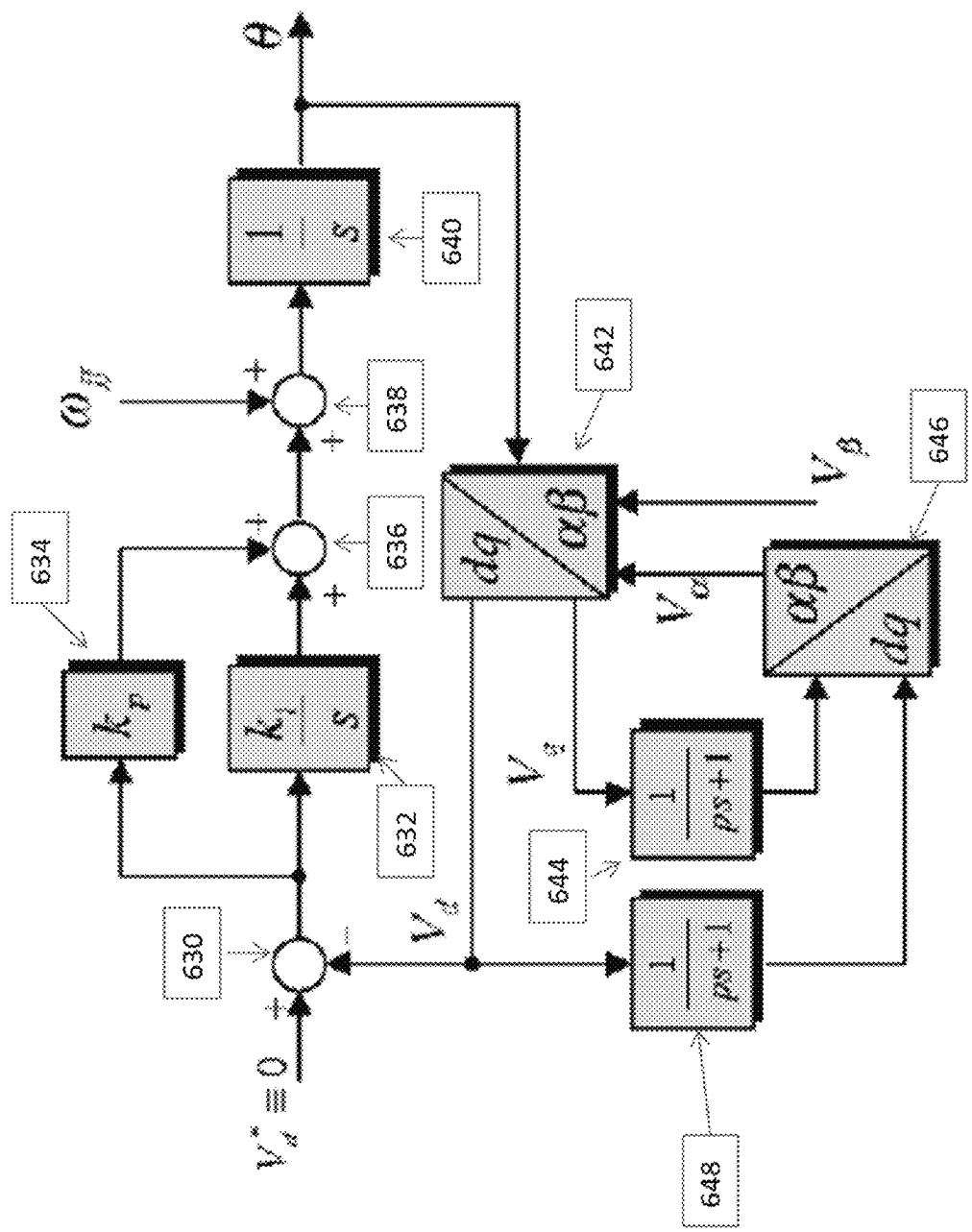
FIG. 5 shows an exemplary phase lock loop with inverse Park transformation.

FIG. 5 shows an exemplary phase lock loop. A single phase voltage (Vβ) and an internally generated signal (Vα) are used as inputs to a Park transformation block (αβ–dq). The d-axis output of the Park transformation is used in a control loop to obtain phase and frequency information of the input signal. Vα is obtained through the use of an inverse Park transformation, where the inputs are the d and q-axis outputs of the Park transformation (dq–αβ) fed through first-order pole blocks. The poles are used to introduce an energy storage element in the internal feedback loops.

Figure 6A:
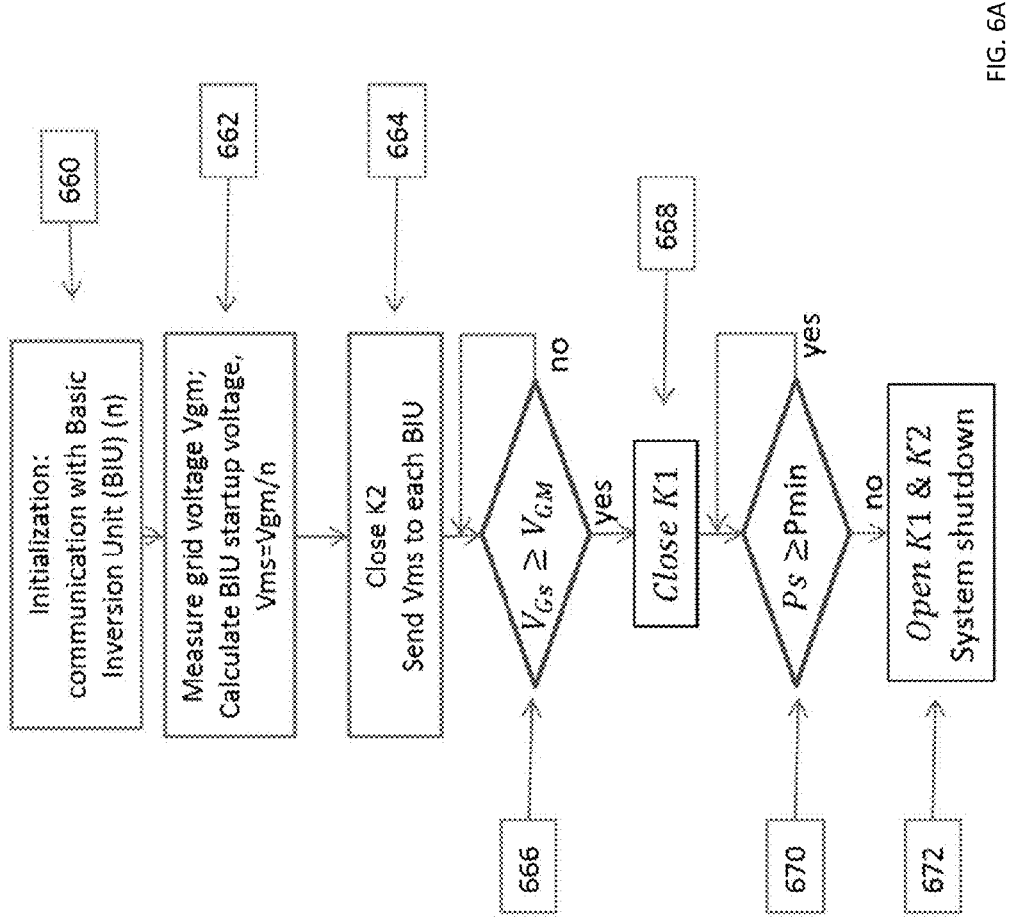
FIG. 6A shows an exemplary system control process for controlling the system of FIG. 2A.

FIG. 6A shows an exemplary process for controlling the system of FIG. 2A. The process first initializes communication with each of n series connected basic inversion units (660). The process then measures a grid voltage Vgm and determines a basic inversion unit startup voltage Voms=Vgm/n, and operating range for basic inversion units (based on grid voltage and number of basic inversion units), Vommax and Vommin, (662). Next, the process closes a relay or a switch K1 and sends the determined Voms, Vommax, Vommin to each basic inversion unit (664).

Next, the process determines if the stacked inverter phase voltage, Vgs, is greater than or equal to grid voltage, Vgm (666) and if not, the process waits until the desired voltage is reached. Once this is achieved, the process closes relay or switch K2 (668). This is normal operating mode where power from P panels is being delivered to the AC grid. Next, the process monitors delivered power to the grid, Ps If the power Ps is greater than or equal to the minimum operating power Pmin (670), the process loops back to 670 to continue providing power. If not, the process opens relays K1 and K2 and performs system shutdown (672).

Figure 6B:
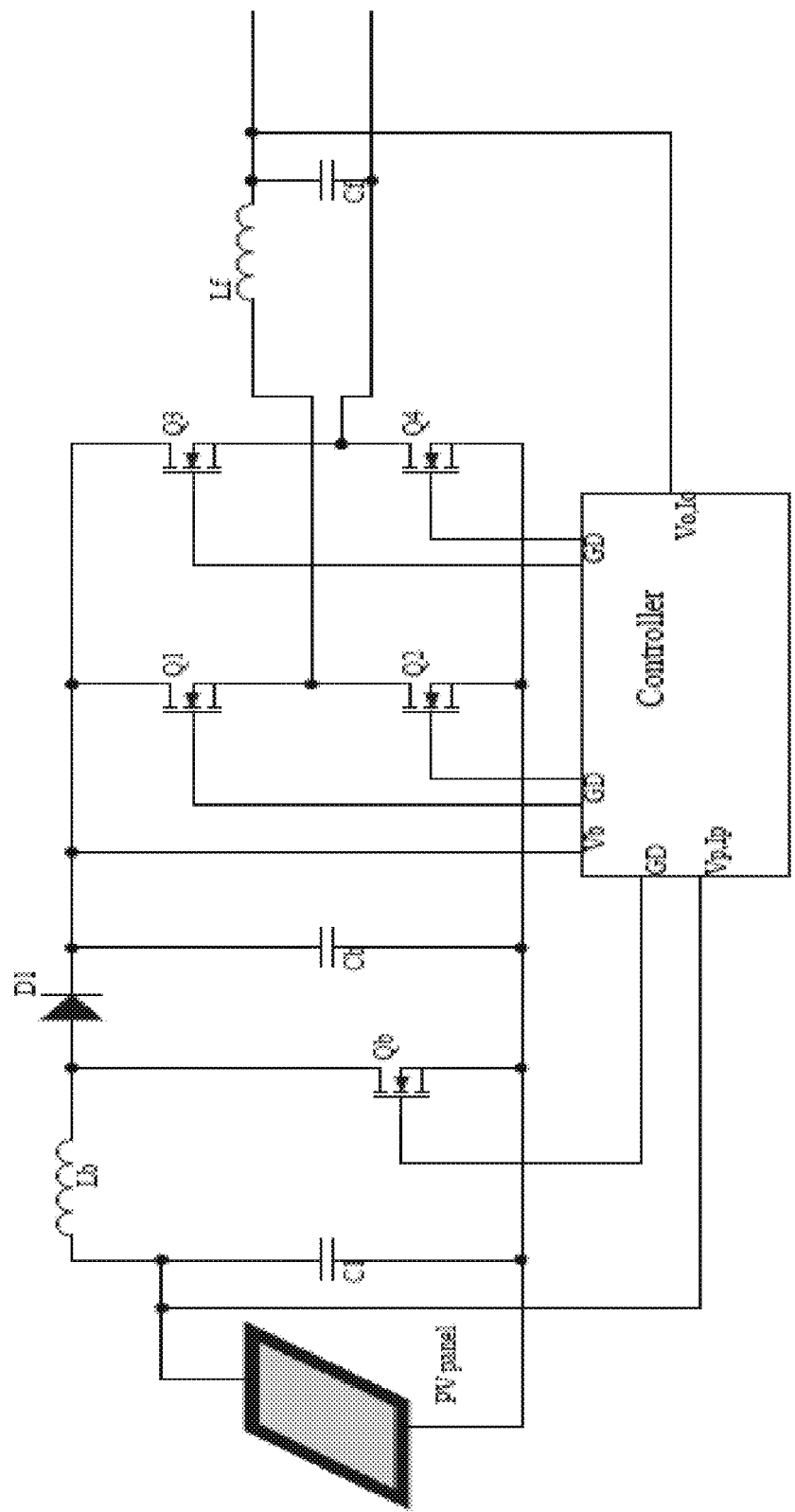
FIG. 6B shows an exemplary basic inversion unit comprising a local controller and full bridge inverter with an LC output filter and an input DC boost converter.
Figure 6C:
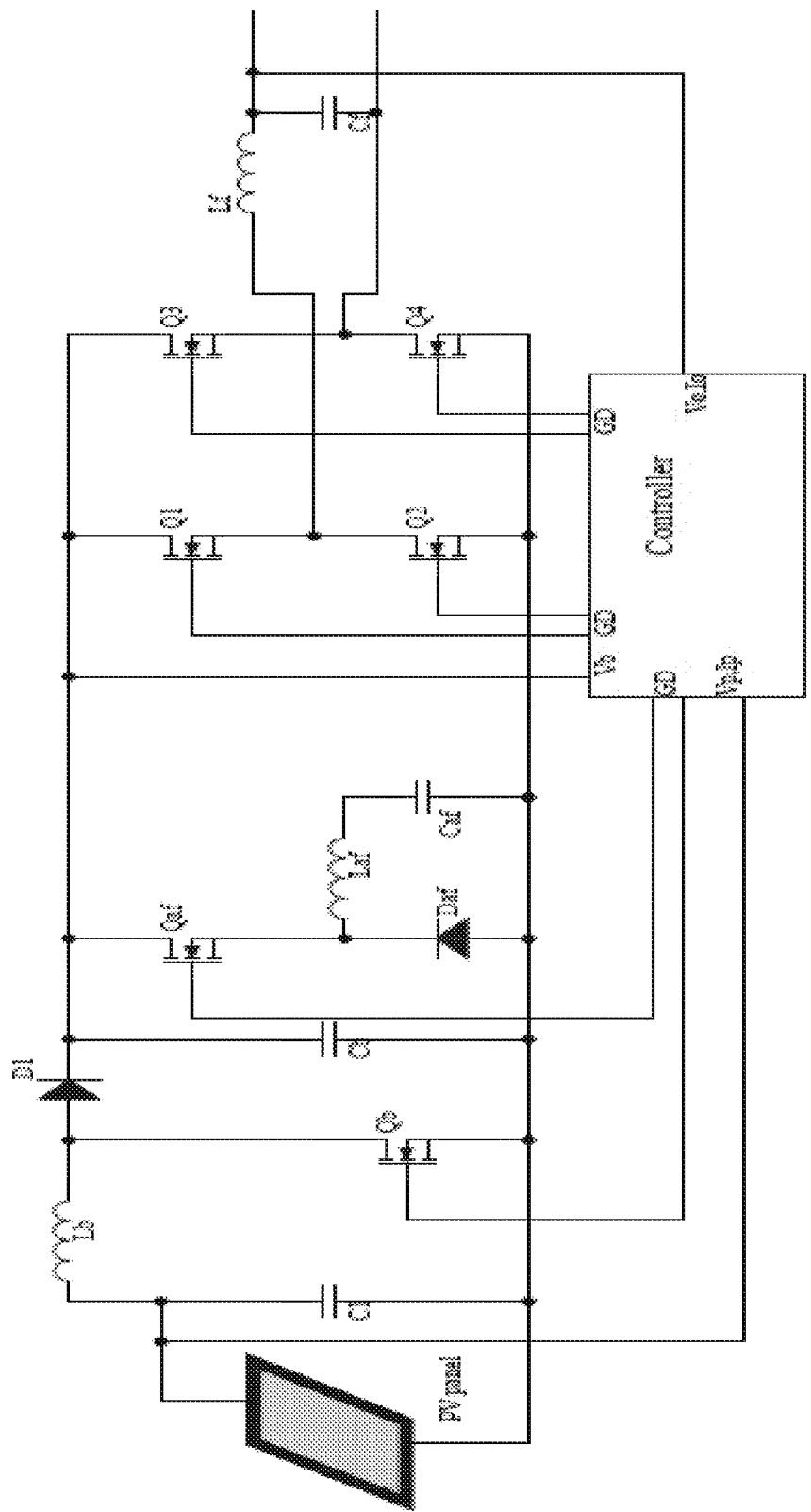
FIG. 6C shows an exemplary basic inversion unit comprising a local controller and full bridge inverter with an LC output filter and an input DC boost converter and active filter.
Figure 6D:
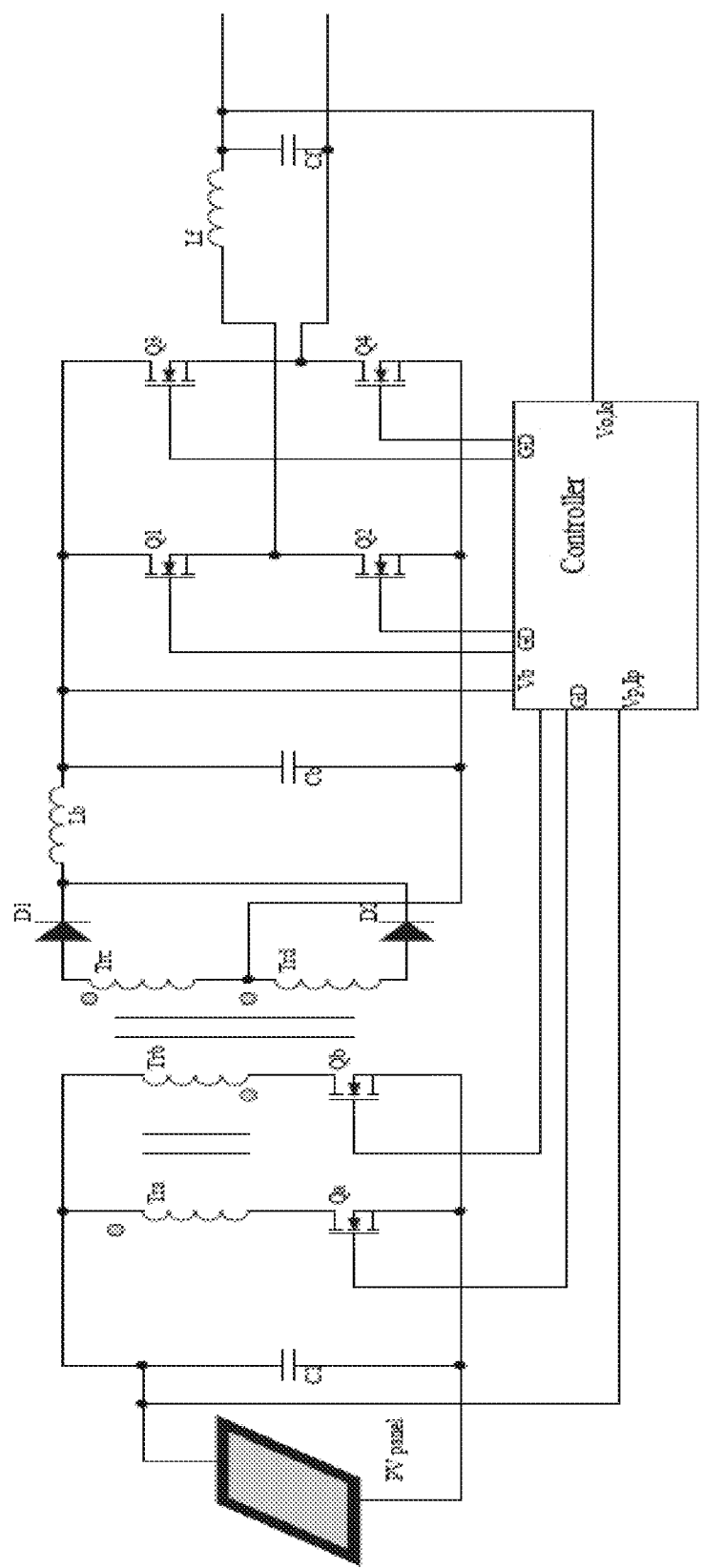
FIG. 6D shows an exemplary basic inversion unit comprising a local controller and full bridge inverter with an LC output filter and push pull DC converter (isolated version configuration).

Next, FIGS. 6B-6D show exemplary basic inversion units that can be used with FIG. 2A. FIG. 6B shows an exemplary basic inversion unit comprising a local controller and full bridge inverter with an LC output filter and a DC boost circuit; FIG. 6C shows an exemplary basic inversion unit comprising a local controller and full bridge inverter with and LC output filter and DC boost circuit and active decoupling filter; and FIG. 6D shows an exemplary basic inversion unit comprising a local controller and full bridge inverter with an LC output filter and push pull DC converter (isolated version). In general, the boost converter (step-up converter) is a power converter with an output DC voltage greater than its input DC voltage. It is a class of switching-mode power supply (SMPS) containing at least two semiconductor switches (a diode and a transistor) and at least one energy storage element. Filters made of capacitors (sometimes in combination with inductors) are normally added to the output of the boost converter to reduce output voltage ripple.

The basic principle of a boost converter consists of two distinct states: in the On-state, the switch is closed, resulting in an increase in the inductor current; in the Off-state, the switch is open and the only path offered to inductor current is through the output diode, the capacitor and the load. These results in transferring the energy accumulated during the On-state into the output capacitor. The input current is the same as the inductor current, so it is not discontinuous as in the buck converter and the requirements on the input filter are relaxed compared to a buck converter.

FIG. 7 shows an exemplary off-grid power control application. In this process, the system controller defines output frequency and operating voltage for each basic inversion unit (690). Next, the system controller assigns a master function to one basic inversion unit (692), and the system controller assigns slave function to all other stacked basic inversion units (694). The master starts first and provides AC power serving as a reference frequency to slave basic inversion units (696). Each slave lock to reference frequency using a PLL and start generating its own AC power (698). The system controller monitors power production and adjusts basic inversion unit operation as necessary (699).

Figure 8:
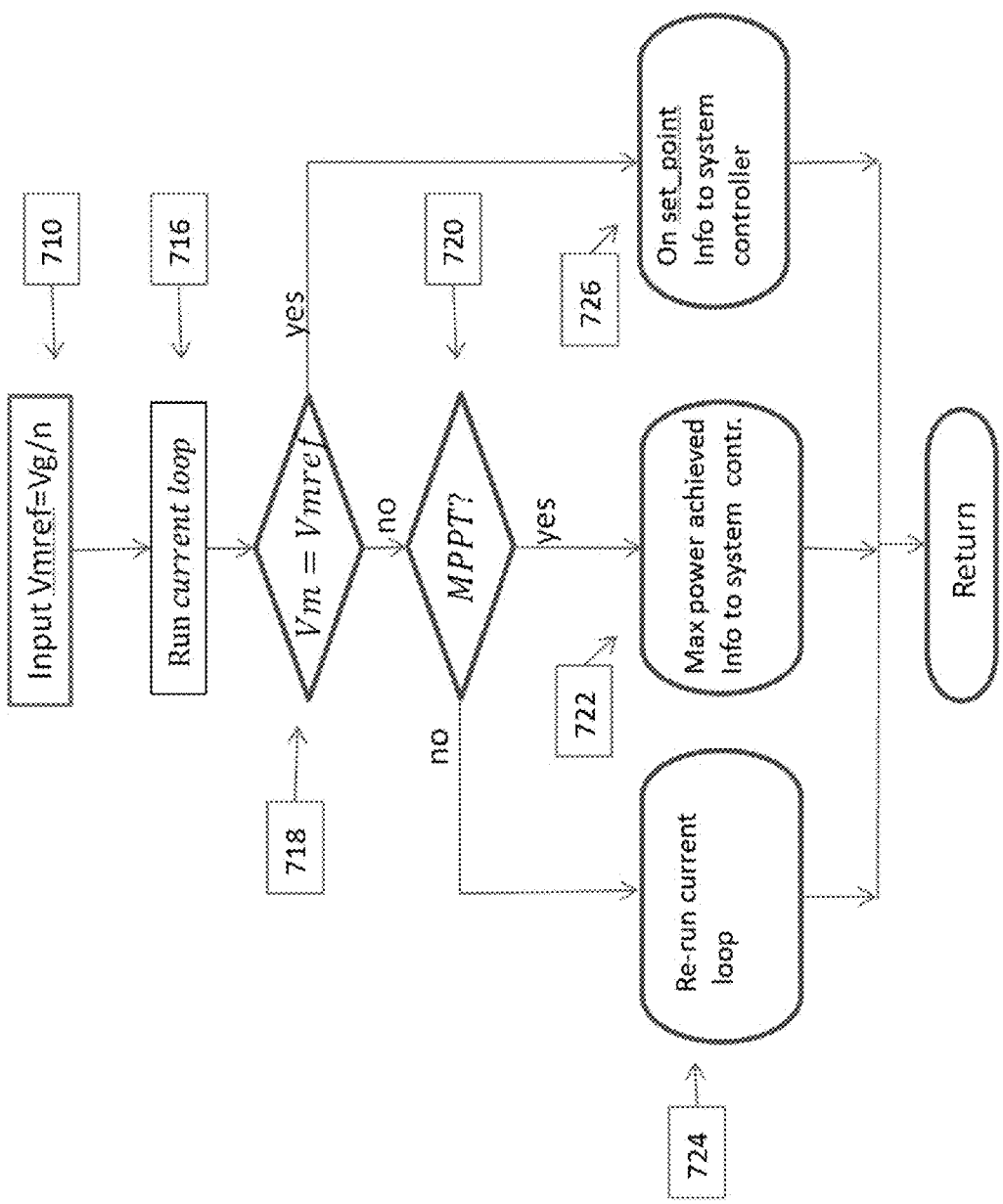
FIG. 8 shows an exemplary master basic inversion unit control process for the off-grid application of FIG. 7.

FIG. 8 shows an exemplary master basic inversion unit control process for the off-grid application of FIG. 7. The system sets an input reference voltage Vmref as Vg/n, where n is the number of series connected basic inversion units (710). Next, the process runs a current loop (716) and generates modulation signal based on the loop output and frequency information received from system controller. The system then determines if Vm is equal to Vmref (718). If not, the system checks if MPPT is achieved (720). If MPPT is not achieved, the system re-runs the current loop (724). Alternatively, if MPPT is achieved, the system notifies the system controller that maximum power has been achieved (722). In 718, if Vm=Vmref, the process sends on set point information to the system controller (726).

Figure 9:
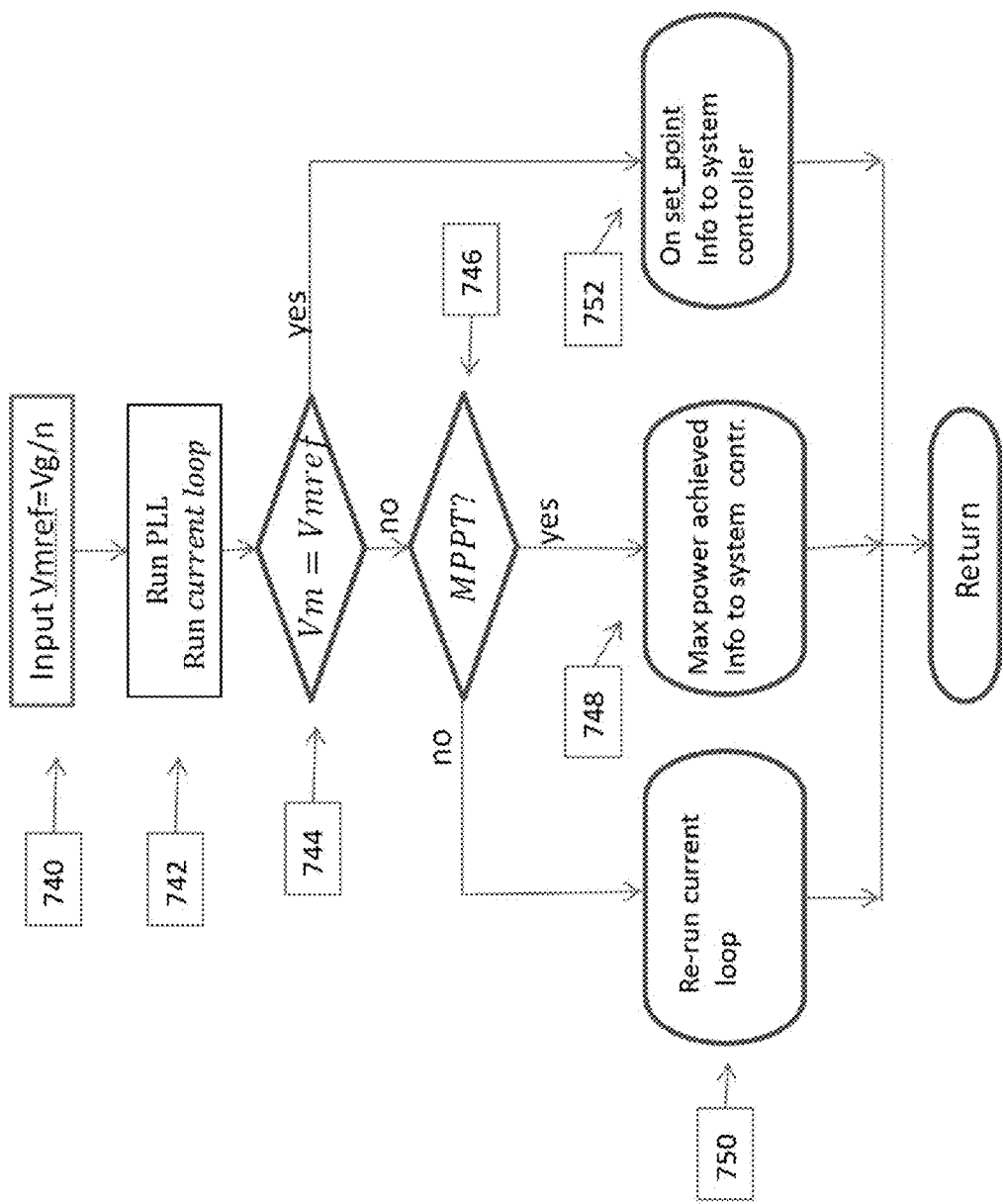
FIG. 9 shows an exemplary slave basic inversion unit control process for the off-grid application of FIG. 7.

FIG. 9 shows an exemplary slave basic inversion unit control process for the off-grid application of FIG. 7. The system sets an input reference voltage Vmref as Vg/n, where n is the number of series connected basic inversion units (740). Next, the process runs a PLL, locks to the AC frequency, runs a current loop (742) and generates modulation signal based on PLL output and the loop output. The system then determines if Vm is equal to Vmref (744). If not, the system checks if MPPT is achieved (746). If MPPT is not achieved, the system re-runs the current loop (750). Alternatively, if MPPT is achieved, the system notifies the system controller that maximum power has been achieved (748). In 744, if Vm=Vmref, the process sends on set point information to the system controller (752).

Figure 10:
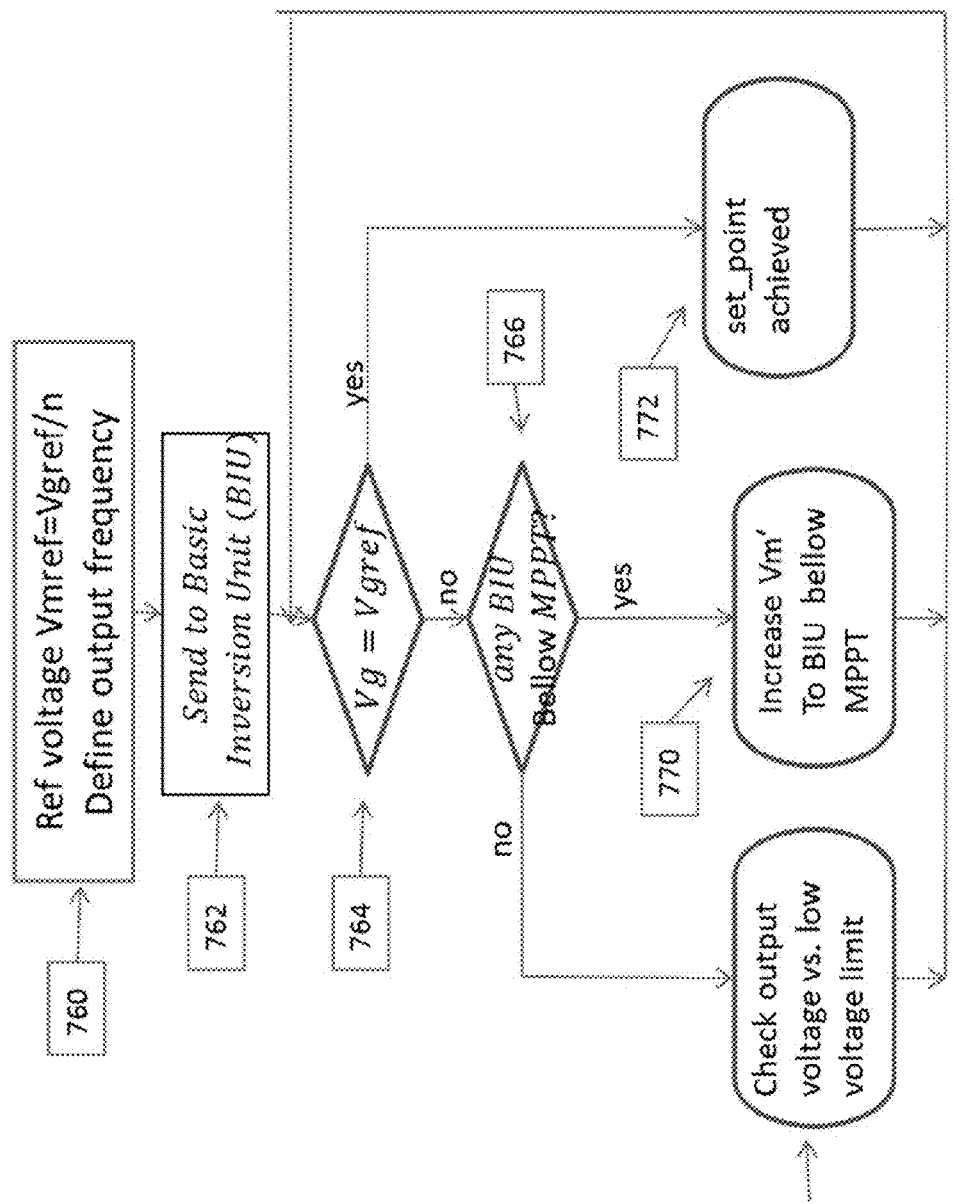
FIG. 10 shows an exemplary system control process for the off-grid application of FIG. 7.

FIG. 10 shows an exemplary system control process for the off-grid application of FIG. 7. The system sets an input reference voltage Vmref as Vg/n, where n is the number of series connected basic inversion units (760) and defines an output frequency. Next, the process sends the reference voltage information and output frequency to the basic inversion units (762). Next, the process determines if Vg is equal to Vgref (764). If not, the system checks each basic inversion unit to see if the MPPT is achieved (766). If no basic inversion unit is below MPPT, the process checks the output voltage against a low voltage limit (768). Alternatively, for basic inversion units whose output is below the MPPT, the process increases the target voltage Vm' to these basic inversion units (770). From 764, if Vg is equal to Vgref, the process notifies the system that the set point voltage has been achieved (772).

In one embodiment, the system includes a junction box with two standard cables and connectors. The use of only two single conductor cables/connectors reduces material and labor costs in installing the system. Each basic inversion unit provides an output AC power to a series connected AC bus. The AC bus terminates into a system controller box. The system controller generally connects together the outputs from all the basic inversion units to form a single AC feed to an electric panel. The photovoltaic (PV) solar energy receiver or panel can use a plurality of solar cells disposed in a lamination stack on a top surface of a substrate. Suitable solar cells may include, for example, conventional single or multi-crystalline silicon solar cells, thin film (e.g., amorphous silicon, cadmium telluride, or copper indium gallium selenide) solar cells, and III-V solar cells.

Figure 11:
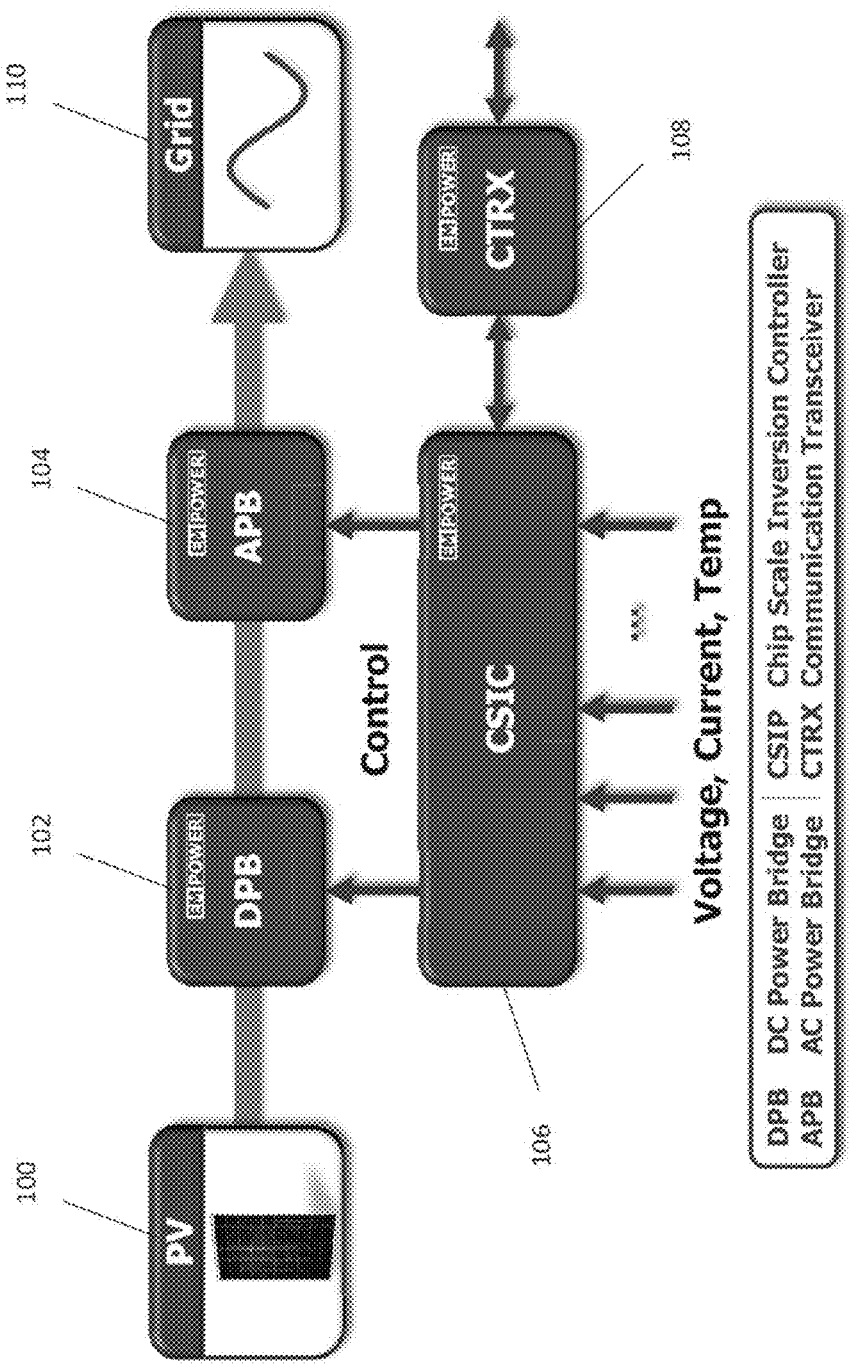
FIG. 11 shows an exemplary integrated circuit implementation of a power generation system of the present invention.

FIG. 11 shows an exemplary integrated circuit implementation of a power generation system. A photovoltaic (PV) solar energy receiver or panel 100 has a plurality of solar cells disposed in a lamination stack on a top surface of a substrate. Suitable solar cells may include, for example, conventional single or multi-crystalline silicon solar cells, thin film (e.g., amorphous silicon, cadmium telluride, or copper indium gallium selenide) solar cells, and III-V solar cells. Although a single string of solar cells can be arranged in a single row, in other variations more or fewer solar cells may be used, and they may be arranged in one, two, or more parallel rows along the substrate. In addition, two or more PV panels 100 may be positioned end-to-end and electrically and fluidly coupled to provide a larger receiver.

Each PV panel 100 is coupled to a micro-inverter that converts DC power generated by the PV panel 100 into AC power. The micro-inverters of the present invention meter out current that is in-phase with the AC grid current and generate such current with low distortion. This is done using a plurality of integrated circuits. In one embodiment, the output of the PV panel 100 is regulated by a DC power bridge (DPB) 102, whose output is provided to an AC power bridge (APB) 104. The output of APB 104 is provided to an electrical grid 110. The DPB 102 and APB 104 are controlled by a chip scale inversion controller (CSIC) 106, which communicates with the system controller through a communication transceiver (CTRX) 108. The CTRX 108 can be a powerline communication, a wireless communication such as a Zigbee, or another form of communication An electric panel can be used to connect the power from a plurality of series connected basic inversion units through the system controller to the power grid and, in some applications, to appliances within a user's facility. For example, in a home, the electric panel is a well-known AC distribution hub having various circuit breakers and/or fuses to distribute electricity to various circuits within the home. The electric panel is coupled through the electric meter to the power grid. The meter determines the amount of power supplied to the grid, such that the owner of the PV panel can be compensated for supplying electricity.

The basic inversion units convert DC to AC in accordance with the control and switching signals produced by the controller. The controller produces the control and switching signals in response to the samples of the DC and AC signals. Consequently, the basic inversion units may be optimally controlled to utilize a particular mode of operation to correspond to the present state of the DC and AC signals, i.e., to optimally match the AC output to the phase of the power grid such that the AC power is efficiently coupled to the power grid.

Using such an AC bus and individual basic inversion units, the system is scalable and flexible to fit any user's needs. The structure and function of the basic inversion units are discussed next.

A DC energy source provides input power to the AC bridge. A decoupling capacitor filters switching ripple from the AC bridge as well as lower frequency ripple from the AC grid. The AC bridge can be a PWM controlled half bridge or full bridge inverter which output terminals are connected to a AC filter. The AC filter can be a low pass filter that filters out the high frequency PWM harmonic noise. The output circuit implements a sensing circuit for synchronization to the AC grid frequency and a disconnect relay.

In some embodiment a DC conversion stage may be required to adjust dc bus voltage for optimal performance. A boost circuit would be, for example, used to increase the operating voltage across the DC link capacitor thereby allowing for a larger peak to peak AC operating voltage across the AC input and output terminals. A larger peak to peak AC operating voltage allows for fewer single level inverters to be used to generate a required stacked phase AC output voltage. A buck circuit would be used to reduce the operating voltage across the DC link capacitor. This would enable use of lower voltage rating transistors in the AC bridge thereby increasing amount of power that one stacked phase can produce and in turn reduce system cost.

DC energy is supplied by a DC electric source which can be a solar panel, a battery, or a vehicular DC generator, among others. The output of the DC electric source is provided to a DC stage, whose output is smoothed by a filter and provided to a bridge circuit. The output of the bridge circuit is provided to a filter, and the resulting output stage is connected in series to the output of other basic inversion units using suitable cables.

In another implementation of this system, DC energy is supplied to each basic inversion unit by a PV panel. The output of the PV is provided to a boost circuit, whose output is smoothed by capacitor and provided to a full bridge inverter circuit. The output of the full bridge inverter circuit is provided to a filter, and the resulting output is series connected to the other basic inversion units using cables.

In one embodiment, the ripple current across the input capacitor has the form of a sine wave at double the line frequency. Using an active decoupling filter, the current from PV panel can be maintained constant and that way maximum power from PV panel can be obtained.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A multiple direct current (DC) voltage source inverter to supply power to an alternating current (AC) power system, comprising:
    a plurality of full bridge inverters, each having a primary node and a secondary node, each of said full bridge inverters having positive and negative node, each of said full bridge inverters having a voltage supporting device electrically connected in a parallel relationship between said positive node and said negative node and a direct current (DC) source connected between the positive and negative nodes;
    at least one stacked inverter phase, each stacked inverter phase having a plurality of said full bridge inverters, each of said full bridge inverters in each stacked inverter phase interconnected in a series relationship with said secondary node of one of said full bridge inverters connected to said primary node of another full bridge inverter, said series interconnection defining a first full bridge inverter and a last full bridge inverter, each phase having an input node at said primary node of said first full bridge inverter and an output node at said secondary node of said last full bridge inverter;
    a local controller coupled to each full bridge inverter providing the control signals to each full bridge inverter to output a nearly sinusoidal voltage waveform, each local controller coupled to a communication transceiver;
    one or more switches or relays connected in series between the primary and or secondary conductor of each said stacked inverter phase and a power grid; and
    a system controller communicating with each local controller communication transceiver, the system level controller generating system control signals for configuration, synchronization, activation, deactivation and operating mode selection of said local controller, and said system controller providing on and off control signals to said switches or relays to prevent reverse power flow from the power grid across said full bridge inverter stages when the output voltage of said stacked inverter phase is or falls below the power grid voltage.

2. The multiple DC voltage source inverter of claim 1, comprising three stacked inverter phases.

3. The multiple DC voltage source inverter of claim 2, comprising three stacked phases connected in a wye (Y) connection.

4. The multiple DC voltage source inverter of claim 2, comprising three stacked phases connected in a delta (Δ) connection.

5. The multiple DC voltage source inverter of claim 1, wherein each full bridge stage incorporates a switch to short its output, allowing the stacked phase with the remaining series connected full bridges to operate.

6. The multiple DC voltage source inverter of claim 1, wherein each full bridge inverter comprises a first switching pair and a second switching pair, each of said switching pairs having a plurality of switching means for controllably regulating electrical current flow, each of said switching means having a first end and a second end, said first switching pair having a plurality of switching means electrically connected at said first end at said positive node of said full bridge inverter, said second end of one of said switching means of said first switching pair electrically connected to said primary node, said second end of another of said switching means of said first switching pair electrically connected to said secondary node, said second switching pair having a plurality of switching means electrically connected at said second ends at said negative node of said full bridge inverter, said first end of one of said switching means of said second switching pair electrically connected to said primary node, said first end of another of said switching means of said second switching pair electrically connected to said secondary node.

7. The multiple DC voltage source inverter of claim 6, wherein a capacitor is connected between the primary and secondary node for synchronization of the nodes.

8. The multiple DC voltage source inverter of claim 6, wherein said switching pair comprises a gate turn-off device and an anti-parallel device connected in parallel and oppositely biased with respect to one another.

9. The multiple DC voltage source inverter of claim 8, wherein said gate turn-off device comprises a component selected from the group consisting of: a gate turn-off thyristor, an insulated gate bipolar transistor (IGBT), a metal-oxide-semiconductor field-effect transistor (MOSFET), a metal semiconductor field effect transistor (MESFET), a junction gate field-effect transistor (JFET), a MOSFET controlled thyristor, a bipolar junction transistor (BJT), a static induction transistor, a static induction thyristor and a MOSFET turn-off thyristor, a gallium nitride (GaN) transistor, a silicon carbide (SiC) transistor.

10. The multiple DC voltage source inverter of claim 8, wherein the antiparallel device is a diode.

11. The multiple DC voltage source inverter of claim 1, comprising a component connected between the positive and negative nodes of said bridge inverter, wherein the component is selected from the group consisting of: capacitors, batteries, fuel cells, photovoltaic cells and biomass cells.

12. The multiple DC voltage source inverter of claim 1, comprising a passive low pass filter connected between switching means and primary and secondary node.

13. The multiple DC voltage source inverter of claim 1, comprising a non-isolated switch mode voltage regulation circuit between the DC power source and the full bridge inverter.

14. The multiple DC voltage source inverter of claim 1, comprising a isolated switch mode voltage regulation circuit between the DC power source and the full bridge inverter.

15. The multiple DC voltage source inverter of claim 1, comprising an active filter to decouple AC current modulation imposed on the DC voltage source when used with current limiting DC sources including photovoltaic cells.

16. The multiple DC voltage source inverter of claim 1, comprising a variable number of full bridges for configuration with variable grid voltages.

17. The multiple DC voltage source inverter of claim 1, wherein each stacked full bridge operates with different power.

18. The multiple DC voltage source inverter of claim 1, comprising a variable number of stacked full bridges for each phase.

19. The multiple DC voltage source inverter of claim 1, having a system controller incorporating two parallel switches selectively connecting each stacked inverter phase to the grid, where at least one of the parallel switches are connected in series with a current limiting device.

20. The multiple DC voltage source inverter of claim 1, wherein the system controller includes at least two parallel switches connected in series between a stacked inverter phase and the grid, each of said switches serving as disconnect means of the stacked inverter phase and the grid, where at least one of the switches being series connected to a current limiting device, where said switch provides a conduction path serving as a current limited phase reference signal from an alternating current (AC) line voltage for one or more local controllers during system initialization;

the system controller calculates and communicates start-up voltage and operating voltage range to each basic inversion unit (BIU);

the system controller determines and communicates control commands for activation and deactivation of each basic inversion unit (BIU);

the system controller determines and communicates control commands for activation and deactivation of whole voltage source inverter.

\* \* \* \* \*